United States Patent [19]

McDonald et al.

[11] Patent Number: 5,113,384
[45] Date of Patent: May 12, 1992

[54] FOCUS CAPTURE METHOD FOR MAGNETO-OPTIC DISK DRIVES

[75] Inventors: James C. McDonald, Black Forest; Gregory V. Hofer, Colorado Springs, both of Colo.

[73] Assignee: Hewlett-Packard Company, Palo Alto, Calif.

[21] Appl. No.: 411,706

[22] Filed: Sep. 25, 1989

[51] Int. Cl.⁵ ............................................... G11B 7/95
[52] U.S. Cl. ............................... 369/44.29; 369/44.34; 369/44.35; 369/54
[58] Field of Search .................... 369/13, 44.27, 44.29, 369/44.34, 44.35, 44.36, 54, 106, 110, 116, 44.25, 32; 360/77.08, 78.04

[56] References Cited

U.S. PATENT DOCUMENTS 4,700,056 10/1987 Silvy et al. ........................ 250/201
4,998,233 3/1991 DiMatteo et al. .................... 369/54

FOREIGN PATENT DOCUMENTS

1220226 9/1989 Japan .
1220227 9/1989 Japan .

Primary Examiner—Roy N. Envall, Jr.
Assistant Examiner—Hung Dang

[57] ABSTRACT

A method for obtaining focus capture in an optical disk drive having a focus servo system with a servo loop and operable in open and closed loop modes, including: opening the servo loop and operating the servo system in the open-loop mode; scanning an objective lens about a focus axis with respect to an optical disk at a calibration velocity; peak detecting focus error signals produced while the lens is scanned at the calibration velocity to determine a peak focus error signal value; storing a calibration threshold value as a function of the peak focus error signal value; scanning the objective lens about the focus axis at a focus capture velocity; comparing the focus error signal values produced while the lens is scanned at the focus capture velocity to the calibration threshold value; and closing the servo loop and operating the focus servo system in the closed-loop mode when the focus error signal values reach the calibration threshold value.

25 Claims, 5 Drawing Sheets

FOCUS CAPTURE METHOD FOR MAGNETO-OPTIC DISK DRIVES

BACKGROUND OF THE INVENTION

1. Field of the Invention

The present invention relates generally to optical disk drive focusing systems. In particular, the present invention is a method for focus capture on a magneto-optic disk drive.

2. Description of the Prior Art

Magneto-optic data recording technology combines the erasability features of magnetic data storage systems with the high data storage capacity of optical systems. A 5.25 inch magneto-optic disk can hold up to 600M bytes of information, 1000 or more times the amount of information that a similarly sized magnetic floppy diskette can store. Magneto-optic disks are also transportable and can be transferred between drives. Since the reading, writing and erasing operations are performed with light beams rather than magnetic heads, they have long life, high reliability, and are relatively immune to physical wear.

The principles of magneto-optic technology are well known. Information is digitally stored at bit positions on a magneto-optic disk. The orientation of the magnetic field at each bit position can be switched between a first or digital one state in which its north pole is oriented upward, and a second or digital zero state in which the magnetic field is reversed and the north pole is oriented downward. The orientation of the magnetic field at each bit position is selected by subjecting the bit position to a magnetic field of the appropriate polarity, and heating the bit position of the disk. The magnetic orientation of the bit position is "frozen" when the disk cools and returns to room temperature.

The magnetic fields of all bit positions in an unwritten disk will generally be oriented with north poles down to represent digital zeros. When writing information, the bit positions will be subjected to a write magnetic bias field and heated by a high intensity laser beam. The orientation of the magnetic fields at the written bit positions will reverse to north poles up. Bit positions are erased by subjecting them to an erase bias field of the opposite polarity, and again heating the bit position. The magnetic field orientation at the erased bit positions will then reverse and switch to north poles down.

Data is read from the optical disk using a low-power or read intensity laser beam. Because of the magneto-optic phenomenon known as the Kerr Effect, the polarization of a laser beam impinged upon the bit positions will be rotated as a function of the magnetic orientation of the bits. The polarization of laser beam portions reflected from bit positions on the optical disk is detected by opto-electronic detector circuitry. Signals from the detector circuitry are then processed to determine whether the bit position is representative of a digital one or zero.

Bit positions are aligned adjacent one another in an elongated servo track on the optical disk. The optical disk can include a single servo track which is spirally positioned on the disk, or a plurality of concentrically positioned servo tracks. The laser beam used to read, write and erase data at the bit positions is focused onto the disk by an objective lens. Optical disk drives of this type typically include a focus servo system for driving the objective lens about a focus axis to keep the laser beam in focus with the disk. A tracking servo system is used to drive the objective lens along a tracking axis perpendicular to the servo tracks, and to maintain the laser beam centered over a desired servo track.

Optical disks typically have an optical layer and a protective layer. The optical layer has magneto-optic properties and is where the individual bit positions reside. The protective layer is clear and protects the optical layer from dust, corrosion, and abrasion. Ideally, the disk should be perfectly flat so the laser beam can remain in focus on the optical layer as the disk rotates. Unfortunately, manufacturing processes cannot produce perfectly flat disks.

A measure of the degree to which the disk is not flat is referred to as vertical runout. As the disk rotates, the disk surface moves up and down with respect to the objective lens because of vertical runout. A plot of the distance between the objective lens and the optical layer as a function of time generally resembles a sine wave. The slope at each point on the plot represents the velocity or the rate of change of distance between the objective lens and the optical layer. Vertical runout is measured in terms of this velocity. The maximum vertical runout is usually included in a disk specification.

After the laser beam has been modulated by the individual bit positions, it is reflected from the optical layer and impinged upon an optical detector. The optical detector is a group of individual elements arranged in a predetermined pattern and upon which the modulated laser beam is impinged.

Circuitry coupled to the optical detector produces focus error signals. The focus error signals are derived from the reflected laser beam, and represent the distance and direction that the objective lens is displaced from proper focus. The focus error signals are processed by a closed-loop focus servo system to generate focus drive signals. The focus drive signals are applied to an actuator or a motor and cause the objective lens to be driven to a position which minimizes the focus error.

The focus servo system monitors the focus error signals and continually adjusts the objective lens position so the laser beam remains in focus with the optical layer. In other words, the focus servo system drives the objective lens about its focus axis so it follows the topography of the disk surface as the disk rotates. The focus servo system maintains a nearly constant relative distance between the objective lens and the optical layer.

The closed-loop focus servo system maintains focus within a given boundary (i.e. maintains focus as long as the lens is close enough to the proper focus position that a focus error signal, which accurately describes the focus condition of the lens, can be derived from the detector). If the objective lens position is outside the given boundary, the focus servo system can no longer maintain lens focus during closed-loop servo system operation. Lens focus must then be recaptured in an open-loop control mode. Typically, there are three situations during which focus capture is required. First, when the disk drive is powered up and the disk begins to rotate, the objective lens is in an arbitrary start up position and is out of focus with the disk. Second, when a new disk is inserted into the drive the objective lens returns to the start up position and focus must be recaptured. Third, the focus servo system can lose focus occasionally during normal closed loop operation and will require focus capture. An example of the third situation is when the disk drive receives external forces of a magnitude greater than a specified limit causing a displacement of the objective lens.

Prior art focus capture techniques have included using a "read signal" threshold to close the focus servo loop. In this technique, the objective lens is driven about its focus axis in an open loop control mode until it approaches a position where it is in focus with prerecorded test data. When the appropriate test data is read, the objective lens position is assumed to be within controllable limits of the focus servo system. The control loop is then closed for normal operation. Unfortunately, this technique works only with sample disk media containing pre-recorded information. Composite "grooved" media may not contain any pre-recorded information and cannot be used in a magneto-optical disk drive using this focus capture technique.

A focus capture technique is also shown in Silvy et al. U.S. Pat. No. 4,700,056. This technique takes advantage of the imperfections in the manufacture of optical disk servo tracks. The radial position of a given servo track from its rotational axis is not constant all the way around the disk. The radial position (i.e. runout) can vary between 20 and 50 $\mu m$ per servo track revolution. Focus capture is performed with a focus servo system in an open-loop mode and an objective lens fixedly positioned along a tracking axis. The objective lens is cyclically driven along a focus axis about a neutral position and between offset positions. Displacement of the offset positions from the neutral position are increased with each successive cycle. At each offset position the number of sensed track crossings resulting from the eccentricity of the servo track are counted during a specified period. Focus capture is recognized when at least a predetermined number of track crossings are counted.

Another focus capture technique, called "fast scan", drives the objective lens along its focus axis and monitors the focus error signal for a condition indicating proper focus. Since the optical disk is formed with an optical layer and a protective layer, portions of the beam are reflected from each layer. Each of the reflections will generate a response in the focus error signal. Focus capture must focus on the optical layer and not on the protective layer. The "fast scan" approach starts the objective lens at a greatest distance from the disk and drives the lens toward the disk at a speed sufficiently greater than the expected vertical runout velocity that only one response will be produced from an in-focus condition on the protective layer. The second response received is then assumed to be produced by the optical layer, and the objective lens is stopped at this position. The closed loop focus servo system then takes control of the objective lens and maintains focus.

The fast scan technique is sufficient for lower performance optical disk drives but is not sufficient for high performance disk drives. Disk drive performance (data access speed) is improved by increasing the rotational velocity of the disk. Increasing the disk rotational velocity causes a proportional increase in the maximum vertical runout velocity. In higher performance magneto-optical disk drives, the relative velocity between the objective lens and the optical layer is too large for the fast scan technique. When the optical layer in-focus response is detected, the objective lens can be moving too fast relative to the optical layer surface to stop and enter the closed loop control mode before the optical layer moves out of the focus servo system control limits.

It is evident that there is a continuing need for improved focus capture techniques. A focus capture method which is effective with high performance magneto-optical disk drives would be especially desirable.

SUMMARY OF THE INVENTION

The present invention is a method for obtaining focus capture in an optical disk drive having a focus servo system with a servo loop operable in open and closed loop control modes. During a calibration subroutine which is performed with the servo system operating in an open-loop mode, an objective lens is scanned about a focus axis with respect to an optical disk at a calibration velocity. Focus error signals are produced while the lens is scanned at the calibration velocity. The focus error signals are peak detected to determine a peak focus error signal. A calibration threshold value is determined as a function of the peak focus error signal and is stored. A focus capture subroutine is initiated and scans the objective lens about the focus axis at a focus capture velocity. Focus error signals produced while the lens is being scanned at the focus capture velocity are compared to the calibration threshold value. When the focus error signals reach the threshold value, the servo loop is closed and the focus servo system is operated in the closed-loop mode. The method of obtaining focus capture is effective and relatively simple to implement.

In one embodiment the objective lens is accelerated for a predetermined period of time after the focus error signals reach the calibration threshold level and before the servo loop is closed. The focus capture velocity is a velocity less than the calibration velocity and less than a maximum vertical runout velocity of the optical disk.

In another embodiment the method also includes operating the disk drive at a reference laser power level while scanning the objective lens at the calibration velocity. The disk drive can subsequently be operated at an operating laser power level while scanning the lens at the focus capture velocity. A working threshold value is generated as a function of the calibration threshold value and a ratio of the operating laser power level to the reference laser power level. Focus error signals produced while the lens is being scanned at the focus capture velocity are compared to the working threshold value. The servo loop is closed when the focus error signals reach the working threshold value.

DETAILED DESCRIPTION OF THE PREFERRED EMBODIMENTS

Figure 1:
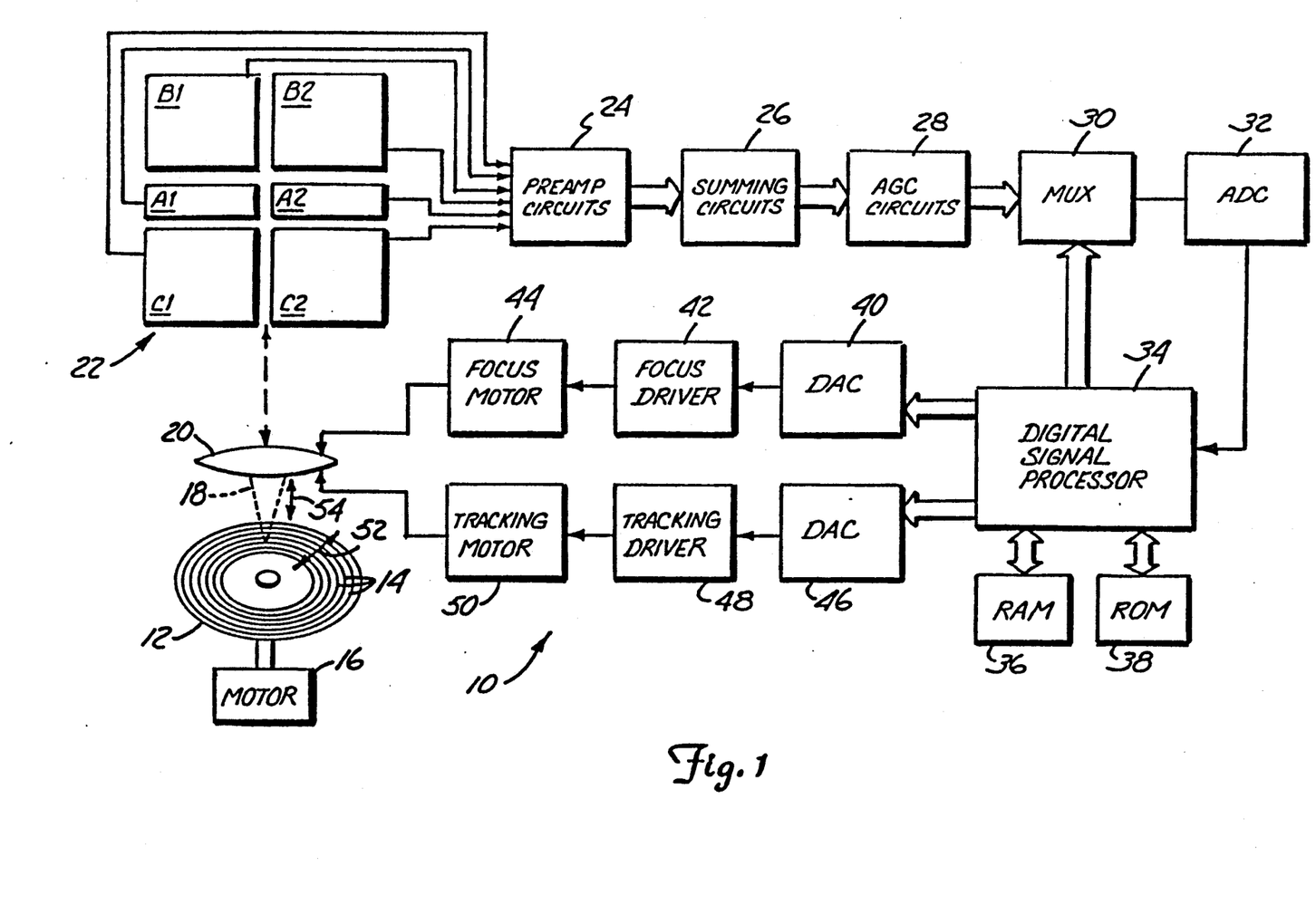
FIG. 1 is a block diagram representation of a magneto-optic disk drive in which the focus capture method of the present invention can be implemented.

A magneto-optic disk drive 10 in which the focus capture method in accordance with the present invention can be implemented is illustrated generally in FIG. 1. Disk drive 10 includes a magneto-optic disk 12 which is rotated by motor 16. Digital information is written, read and erased at individual bit positions (not visible) on servo tracks 14 of disk 12 using a laser beam 18. Beam 18 is generated by a laser (not shown) and focused on disk 12 by objective lens 20. When writing or erasing data on servo tracks 14, laser beam 18 is switched to a high or write intensity level while a magnetic bias field having the appropriate write or erase polarity, respectively, is impinged upon the bit positions. Digital information is thereby represented and stored as a function of the magnetic orientation of the bit positions.

Laser beam 18 is switched to a low or read intensity level when information is being read from bit positions on disk 12. After being focused onto servo tracks 14, the polarization angle of the read intensity beam 18 is modulated as a function of the magnetic orientation of the bit positions. The modulated beam 18 is reflected from disk 12 and impinged upon a pair of detectors 22 (only one is shown). In the illustrated embodiment, detector 22 includes six elements A1, A2, B1, B2, C1, and C2. Other detector arrangements are also known. An information signal representative of the digital states of the bit positions is derived differently from the two detectors such as 22 in a known manner.

Disk drive 10 also includes tracking and focus servo systems for accurately positioning objective lens 20 with respect to bit positions of desired servo tracks 14 at which information is to be written, read or erased. Common elements of both the focus and tracking servo systems include objective lens 20, detector 22, preamp (preamplifier) circuits 24, summing circuits 26, AGC (automatic gain control) circuits 28, MUX (multiplexer) 30, ADC (analog-to-digital converter) 32 and digital signal processor 34 and its associated RAM (random access memory) 36 and ROM (read only memory) 38. Elements specific to the focus servo system include DAC (digital-to-analog) converter 40, focus driver 42, and focus motor 44. Elements specific to the tracking servo system are DAC 46, tracking driver 48, and tracking motor 50. The tracking servo system drives and positions objective lens 20 about a tracking axis 52 so as to center laser beam 18 on a desired servo track 14. The focus servo system drives and positions objective lens 20 about a focus axis 54 so as to properly focus laser beam 18 onto magneto-optic disk 12. The closed optical and electrical paths through the tracking and focus servo systems are characterized as servo loops.

After contacting disk 12, laser beam 18 is reflected back through lens 20 and impinged upon various sections A1, A2, B1, B2, C1, and C2 of detector 22. Detector signals produced by each of these detector sections are individually amplified by preamp circuits 24 and applied to summing circuits 26. Summing circuits 26 combine the detector signals in a predetermined manner to produce a tracking error signal, focus error signal, and hex sum signal. Detector 22 is aligned in such a manner that the elongated space separating detector sections A1, B1 and C1 from sections A2, B2 and C2 is perpendicular to tracking axis 52.

The focus and tracking error signals are generally representative of the direction and distance that lens 20 is displaced from its proper focus and tracking positions. The analog tracking error, focus error, and hex sum signals are each applied to AGC circuits 28. AGC circuits 28 normalize the tracking error signals and the focus error signals by dividing these signals as they are received from summing circuits 26 by the hex sum signals. The normalized tracking error signals and focus error signals are individually applied to MUX 30 from AGC circuits 28. MUX 30 is controlled by digital signal processor 34 and selectively routes the normalized focus and tracking error signals to ADC 32. ADC 32 digitizes the focus and tracking error signals, and applies them to digital signal processor 34.

Digital signal processor 34 processes the tracking and focus error signals in a predetermined manner in accordance with a program which can be stored in ROM 38. Digital focus control signals are generated as a function of the focus error signals. The digital focus control signals are applied to DAC 40 and converted to analog form. Focus driver 42 converts the analog focus control signals into focus drive signals having the electric current characteristics required to drive focus motor 44. In response to the focus drive signals, focus motor 44 drives objective lens 20 about focus axis 54, and positions the lens at locations causing laser beam 18 to be properly focused onto magneto-optic disk 12.

When operated in the closed-loop mode described above, the focus servo system accurately positions objective lens 20 on focus axis 54 so data can be reliably written, read and erased at bit positions of disk 12. The closed-loop mode of operation maintains focus capture. Each time drive 10 is powered up, a new disk 12 is inserted, or if focus is lost, digital signal processor 34 executes a focus capture software program.

The focus capture software program is stored in RAM 36 or ROM 38 shown in FIG. 1. The focus capture software program is executed by digital signal processor 34 to control the position of lens 20 in the open-loop mode. During the program execution, digital signal processor 34 monitors the focus error signals selected by MUX 30 and applies focus drive signals to focus motor 44 through DAC 40 and focus driver 42. Focus motor 44 responds by driving the objective lens 20 about focus axis 54 until focus capture is obtained. Digital signal processor 34 is then returned to the closed-loop mode of operation to maintain focus capture.

Figure 2:
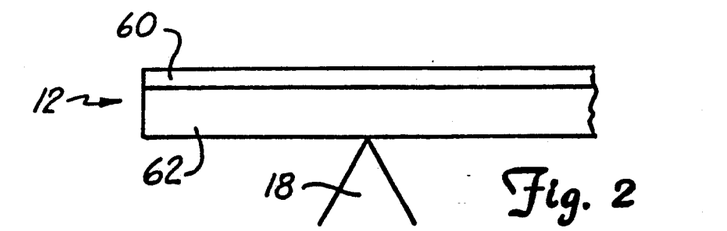
FIG. 2 is a detailed view of the optical disk shown in FIG. 1.

The focus capture software program must focus laser beam 18 correctly on disk 12 for accurate operation of magneto-optic disk drive 10. FIG. 2 shows disk 12 of FIG. 1 in greater detail. Disk 12 includes optical layer 60 and protective layer 62. The individual bit positions reside on optical layer 60. The focus capture software program must focus objective lens 20 and therefore laser beam 18 onto optical layer 60 and not onto protective layer 62. As laser beam 18 is impinged on disk 12, protective layer 62 typically reflects 5-6 percent of laser beam 18 toward detectors 22. Optical layer 60 typically reflects 10-35 percent of laser beam 18 toward detectors 22. Focus error signals are generated which are responsive to the reflections from both optical layer 60 and protective layer 62. The focus capture software program monitors the focus error signals and filters out the responses corresponding to the reflections from protective layer 62 so objective lens 20 is focused correctly on only optical layer 60.

Figure 3:
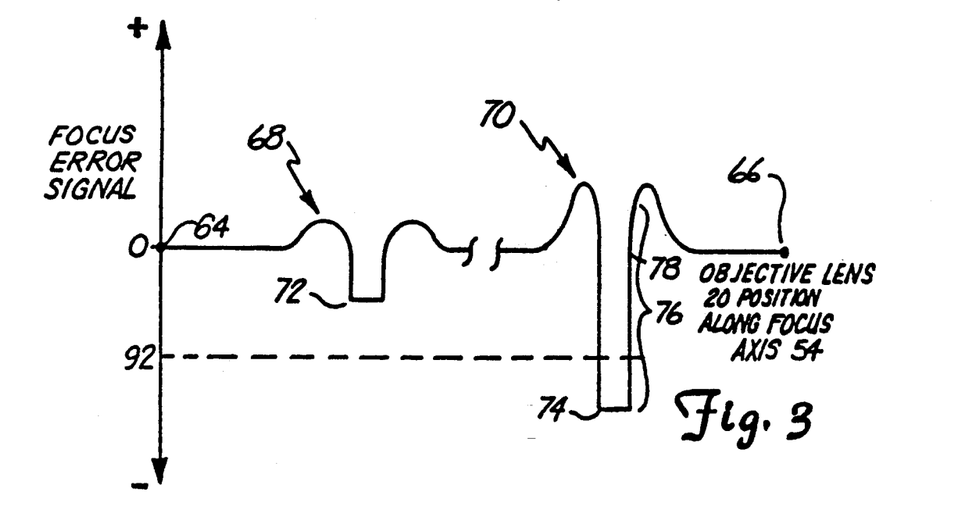
FIG. 3 is a graphical representation of a focus error signal plotted as a function of the objective lens position along the focus axis shown in FIG. 1.

An example of a focus error signal is shown in FIG. 3. The focus error signal is plotted as a function of the position of objective lens 20 along focus axis 54 (shown in FIG. 1). If objective lens 20 is positioned at a greatest distance 64 from disk 12 and is scanned toward a closest distance 66 along focus axis 54, the focus error signal obtained will be similar to the focus error signal shown in FIG. 3. The responses shown are of a typical protective layer response 68 and a typical optical layer response 70. Optical layer response 70 is similar to protective layer response 68 but has a greater magnitude since the reflective qualities of optical layer 60 are much better than those of protective layer 62.

As objective lens 20 moves along focus axis 54, it comes in-focus with protective layer 62. The focus error response obtained is shown by protective layer response 68. Protective layer response 68 includes a negative peak 72.

As objective lens 20 moves farther along focus axis 54, it comes in-focus with optical layer 60. The focus error response obtained is shown by optical layer response 70. Optical layer response 70 includes a negative peak 74. Optical layer response 70 also includes a linear region 76 having a zero-crossing. The zero-crossing defines an in-focus position 78 of objective lens 20 with respect to optical layer 60, and represents a focus error of zero. Linear region 76 is where the focus error has a magnitude and sign representative of the distance and direction, respectively, that objective lens 20 is displaced from the in-focus position 78. The closed-loop focus servo system can maintain focus capture as long as the focus error signal is within linear region 76.

If the objective lens position is outside of linear region 76, the focus capture software program will operate digital signal processor 34 in the open-loop mode to position objective lens 20 in linear region 76.

Figure 4:
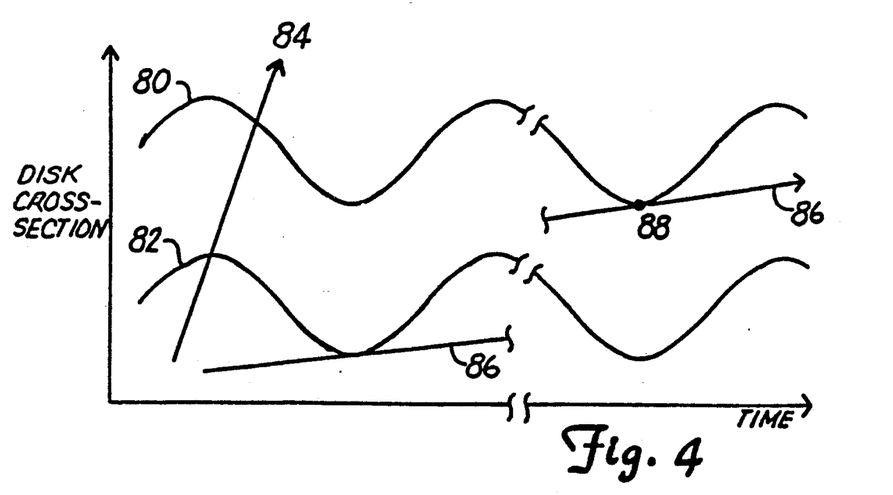
FIG. 4 is a graphical representation of vertical runout of the optical layer and the protective layer as functions of time; superimposed on this graph are fast and slow scan lines representing the position of the objective lens as it is driven along the focus axis.

FIG. 4 is a graph of the vertical runout (wave forms 80 and 82) of optical layer 60 and protective layer 62, respectively, as functions of time. The velocity of the vertical runout is determined by the slope of waveforms 80 and 82. Superimposed on this graph are fast and slow scan lines 84 and 86 representing the position of objective lens 20 along focus axis 54 as functions of time. Fast scan line 84 is generated by driving objective lens 20 along focus axis 54 at a velocity greater than the maximum vertical runout velocity of disk 12. The velocity of objective lens 20 during a fast scan is represented by the slope of the fast scan line 84. Slow scan line 86 is similar to fast scan line 84, but objective lens 20 is driven at a lower velocity and therefore slow scan line 86 has a lesser slope than fast scan line 84.

The graphs in FIG. 4 have been superimposed to show the relative velocities between objective lens 20 and the optical and protective layers 60 and 62 during a fast and slow scan of objective lens 20 along focus axis 54. During a fast scan, the relative velocity between objective lens 20 and optical layer 60 can be quite large. During a slow scan there can be several instances in which the relative velocity between objective lens 20 and optical layer 60 is near zero. An example is shown in FIG. 4 at intersection 88.

During focus capture, it is preferable to stop scanning objective lens 20 when it enters linear region 76 shown in FIG. 3. It is also preferable to stop scanning objective lens 20 when the relative velocity is as close to zero as possible. This allows the digital signal processor 34 enough time to enter the normal closed-loop operation of the focus servo system before objective lens 20 moves out of linear region 76. The focus servo system can then maintain focus capture and allow objective lens 20 to follow the topography of disk 12 as it rotates.

Figure 5:
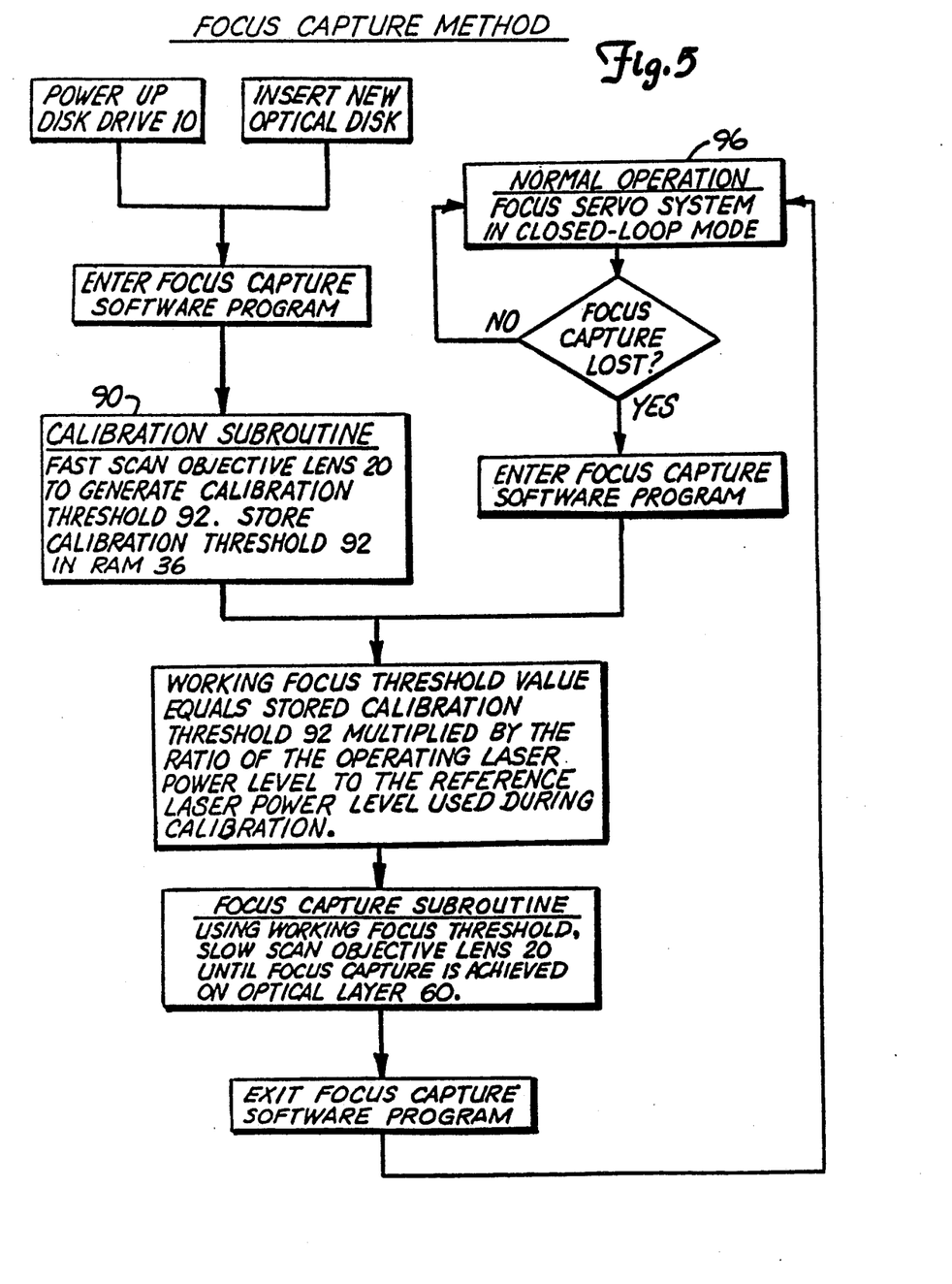
FIG. 5 is a flow chart illustrating the sequence of steps performed by the digital signal processor in accordance with the focus capture method of the present invention.
Figure 6:
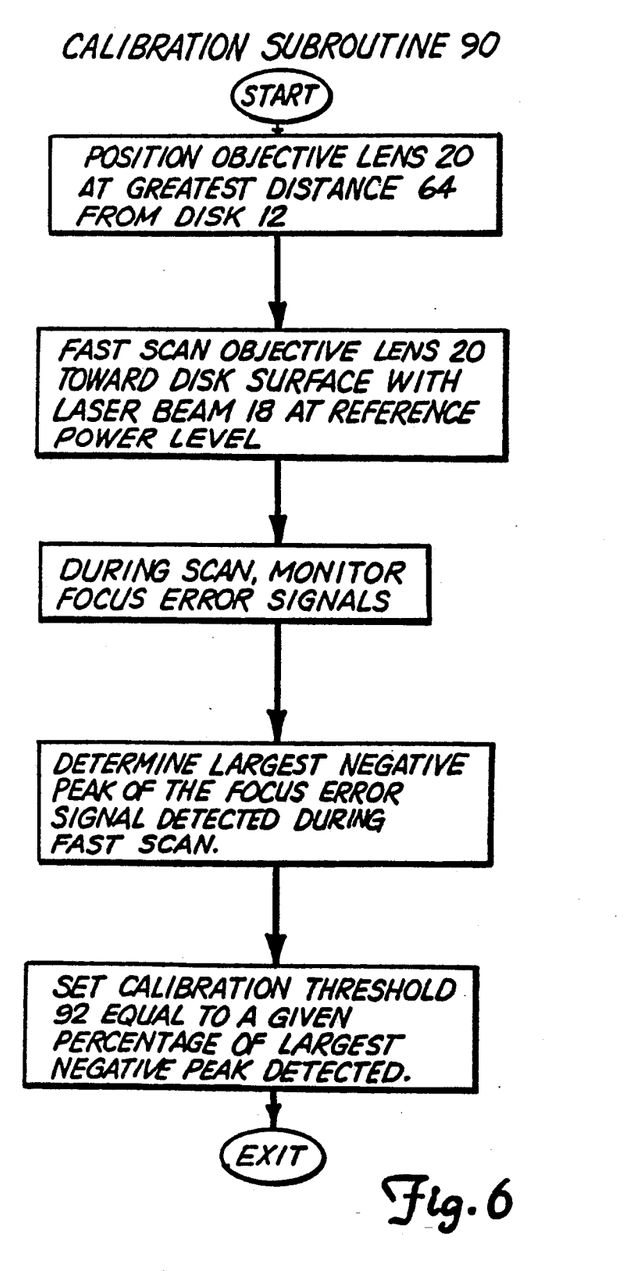
FIG. 6 is a flow chart illustrating in detail the steps performed by the calibration subroutine referred to in FIG. 5.
Figure 7:
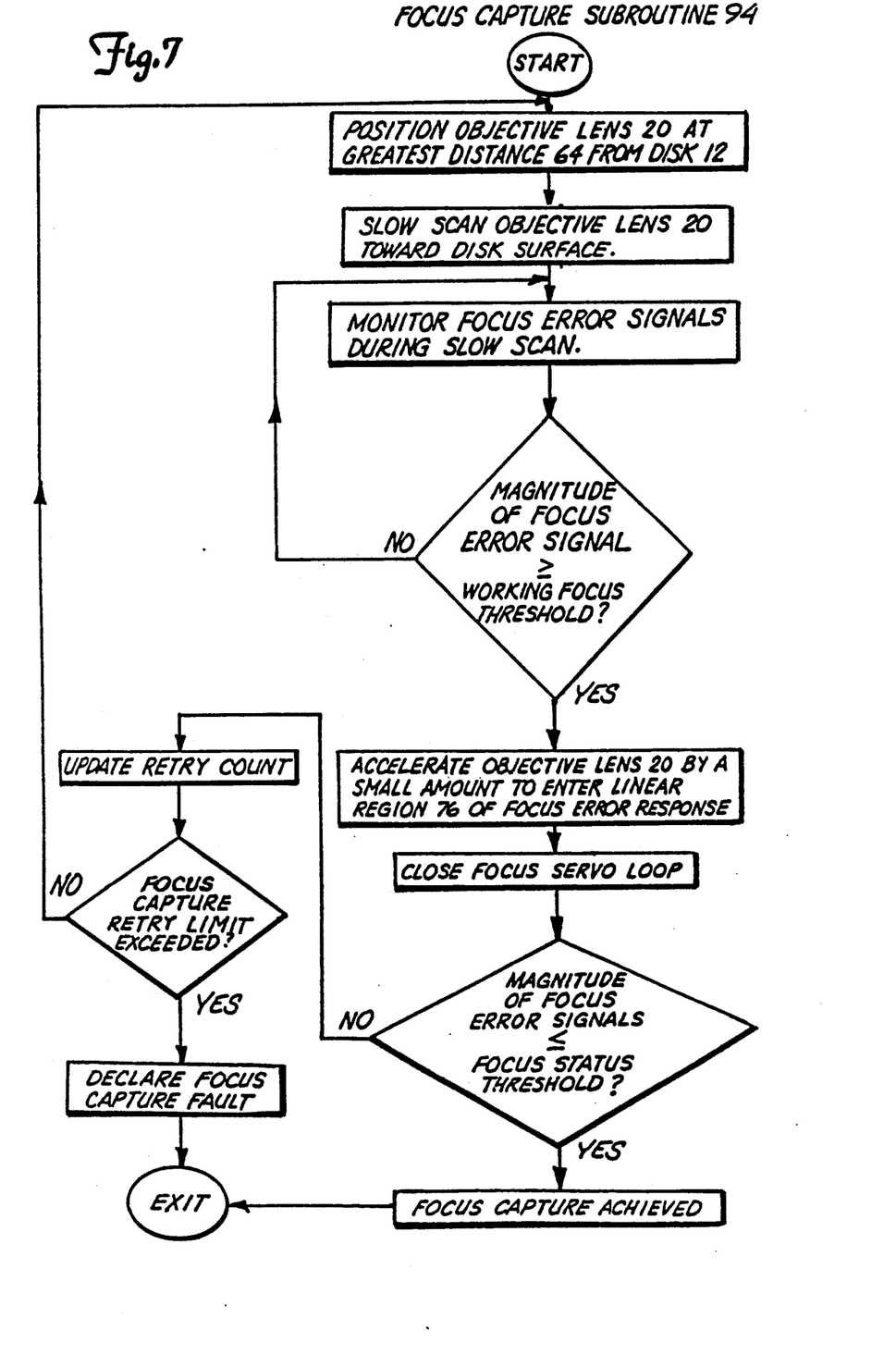
FIG. 7 is a flow chart illustrating in detail the steps performed by the focus capture subroutine referred to in FIG. 5.

FIGS. 5–7 show step by step flow charts of the focus capture method of the present invention for use on magneto-optic disk drive 10 described in FIGS. 1–4. FIGS. 6 and 7 show in more detail the steps performed by a calibration subroutine 90 and a focus capture subroutine 94 referred to in FIG. 5.

As shown in FIG. 5, the focus capture software program is executed when magneto-optic disk drive 10 is powered up, when a new disk is inserted, or when focus capture is lost during normal operation 96. The focus capture software program controls the focus servo system in the open-loop mode.

The first step after power up or after a new disk is inserted is to calibrate the focus capture software program to the magnetic and reflective properties of disk 12 (the current disk) and to the electronic properties of the individual components which comprise the focus servo system. Calibration is performed by calibration subroutine 90, which is described in greater detail in FIG. 6. In calibration subroutine 90, objective lens 20 is driven toward the surface of disk 12 at a calibration velocity which is greater than the maximum vertical runout velocity of disk 12. This is shown in FIG. 4 as fast scan line 84. The maximum vertical runout for disk 12 in one embodiment is approximately 118 millimeters/second (mm/s) at a disk rotation rate of 54 Hertz. Given these values, the fast scan of objective lens 20 can be done at approximately 200 mm/s. It should be known that these values are only examples and can be varied widely.

During calibration, laser beam 18 is operated at a reference power level. The magnitudes of the focus error signal responses are sensitive to the power level of laser beam 18. With laser beam 18 set to the reference power level during calibration, subsequent responses in the focus error signals obtained with various power levels of laser beam 18 can be correlated to the responses obtained during calibration. An example of a reference power level is 1.0 milliwatts.

During the fast scan of objective lens 20, laser beam 18 is impinged on disk 12 and is reflected and impinged on detectors 22 shown in FIG. 1. Digital signal processor 34 monitors the focus error signals and determines a peak focus error signal which is the largest negative peak detected during the fast scan. The largest negative peak detected will be negative peak 74 of optical layer response 70 as shown in FIG. 3. Optical layer response 70 has a greater magnitude than protective layer response 68 since more of laser beam 18 is reflected by optical layer 60 than is reflected by protective layer 62. A calibration threshold 92 (shown in FIG. 3) is determined as a function of the peak focus error signal. In one embodiment, calibration threshold 92 is set to 75 percent of the largest negative peak detected (negative peak 74). Digital signal processor 34 then stores calibration threshold 92 in RAM 36 for future reference. The focus capture software program is now calibrated.

A working focus threshold is set equal to the stored calibration threshold 92 multiplied by the ratio of the operating laser power level to the reference laser power level. The working focus threshold is a variable used by the focus capture software program.

The second step is to obtain focus capture by executing focus capture subroutine 94, which is shown in FIG. 7. In focus capture subroutine 94, objective lens 20 is again positioned at greatest distance 64 (shown in FIG. 3) from disk 12. A slow scan is performed by driving objective lens 20 at a relatively slow focus capture velocity about focus axis 54 as shown by slow scan line 86 in FIG. 4. A slow scan can be performed at a velocity of 1.0 mm/s. Digital signal processor 34 monitors the focus error signals until it detects a magnitude greater than or equal to the working focus threshold. At this position objective lens 20 is nearing linear region 76 of the focus error signal shown in FIG. 3. When the focus error signal magnitude is greater than the working focus threshold, digital signal processor 34 adjusts focus drive signals in the open-loop control mode of objective lens 20 to accelerate or "kick" objective lens 20 by a small amount such as 2.5 m/s² for a short period of time. This places objective lens 20 in linear region 76 of the focus error signal.

Once objective lens 20 is in linear region 76, the focus servo system is placed in the closed-loop control mode. Digital signal processor 34 monitors the focus error signals and compares them to a focus status threshold stored in RAM 36 or ROM 38 for determining if focus capture is achieved. The focus status threshold is indicative of focus error signal values which are within limits defining when focus capture is achieved. If the focus error signals are not within these limits, digital signal processor 34 repeats focus capture subroutine 94. Each time subroutine 94 is repeated, a focus capture retry count, stored in RAM 36, is updated. Digital signal processor 34 can repeat this loop until either focus capture is achieved or a focus capture retry limit, stored in RAM 36 or ROM 38, is exceeded. If the retry limit is exceeded, focus capture subroutine 94 declares a focus capture fault. If focus capture has been achieved, digital signal processor 34 exits focus capture subroutine 94 and enters normal operation 96 of the focus servo system.

FIG. 4 shows that during slow scan, the working focus threshold will be sensed when the vertical runout is at approximately zero velocity and the relative velocity between lens 20 and disk 12 is low. An example of this is shown at intersection 88. When the relative velocity between objective lens 20 and optical layer 60 is near zero, it is very easy for the focus servo system to take control of the actuation of objective lens 20 and maintain focus capture.

Digital signal processor 34 then exits the focus capture software program and enters the normal closed-loop control mode of magneto-optic disk drive 10 illustrated as normal operation 96 in FIG. 5. Magneto-optic disk drive 10 is now ready for normal read, write and erase operations.

The magneto-optic disk drive 10 is calibrated for the reflective and magnetic properties of disk 12. Each time a new disk is inserted, calibration subroutine 90 must be reexecuted since each disk has slightly different reflective and magnetic properties. These new disks generate focus error signals having different magnitudes of negative peaks than the original disk 12. Once calibration subroutine 90 is completed, a new calibration threshold is stored in RAM 36.

During normal operation 96, laser beam 18 can be operated at various power levels. These power levels do not have to be equal to the reference power level used during calibration subroutine 90. If the closed-loop focus servo system loses focus during normal operation 96, focus may be captured at the operating laser power level without recalibrating (see FIG. 5). In this case, the working focus threshold value used during focus capture subroutine 94 is calculated by multiplying the stored calibration threshold 92 by the ratio of the operating power level to the reference laser power level used during calibration. The working focus threshold is then used in focus capture subroutine 94 to position objective lens 20 within linear region 76 while laser beam 18 is at the operating power level.

The present invention provides a focus capture method which can be used in high performance magneto-optic disk drives having high disk rotation rates. Calibration subroutine 90 calibrates magneto-optic disk drive 10 for each disk inserted. A variety of disks may be used and transferred between drives without a performance penalty. The method is effective, accurate and relatively simple to implement.

Although the present invention has been described with reference to preferred embodiments, workers skilled in the art will recognize that changes may be made in form and detail without departing from the spirit and scope of the invention.

What is claimed is:

1. A method for obtaining focus capture in an optical disk drive having a focus servo system with a servo loop and operable in open and closed loop modes, including:
    opening the servo loop and operating the servo system in the open-loop mode;
    scanning an objective lens about a focus axis with respect to an optical disk at a calibration velocity;
    peak detecting focus error signals produced while the lens is scanned at the calibration velocity to determine a peak focus error signal value;
    storing a calibration threshold value as a function of the peak focus error signal value;
    scanning the objective lens about the focus axis at a focus capture velocity;
    comparing the focus error signal values produced while the lens is scanned at the focus capture velocity to the calibration threshold value; and
    closing the servo loop and operating the focus servo system in the closed-loop mode when the focus error signal values reach the calibration threshold value.

2. The method of claim 1 wherein the steps of scanning the objective lens at a calibration velocity and scanning the objective lens at a focus capture velocity include driving the objective lens from a position spaced from the optical disk toward the optical disk.

3. The method of claim 1 wherein scanning the objective lens about the focus axis at a focus capture velocity includes scanning the objective lens at a focus capture velocity which is less then the calibration velocity.

4. The method of claim 3 wherein scanning the objective lens at a focus capture velocity includes scanning the objective lens at a focus capture velocity which is less then a maximum vertical runout velocity of the optical disk.

5. The method of claim 1 and further including a step of accelerating the objective lens for a determined period of time after the focus error signal values reach the threshold value and before closing the servo loop.

6. A method of claim 1 and further including:

operating the disk drive at a reference laser power level while scanning the objective lens at the calibration velocity;

operating the disk drive at an operating laser power level after closing the servo loop;

opening the servo loop and operating the servo system in the open-loop mode;

generating and storing a working threshold value as a function of the calibration threshold value, the reference laser power level and the operating laser power level;

scanning the objective lens about a focus axis at the focus capture velocity;

comparing the focus error signal values produced while the lens is scanned at the focus capture velocity to the working threshold value; and closing the servo loop and operating the focus servo system in the closed-loop mode when the focus error signal values reach the working threshold value.

7. The method of claim 6 wherein generating a working threshold value includes generating the working threshold value as a function of the calibration threshold value and a ratio of the operating laser power level to the calibration laser power level.

8. The method of claim 1 wherein storing a calibration threshold value includes storing a calibration threshold value equal to approximately 75 percent of the peak focus error signal value.

9. The method of claim 1 and further including:

storing a focus status threshold value indicative of focus error signal values which are within limits defining when focus capture is achieved;

comparing focus error signal values to the focus capture status threshold value after closing the servo loop for determining if a focus capture is achieved; and repeating the steps of opening the servo loop, scanning the objective lens of a focus capture velocity, comparing the focus error signal values to the calibration threshold value, closing the servo loop, and comparing the focus error signal values to the focus capture status threshold value until focus capture is achieved or until the steps are repeated a specified number of times.

10. A method for operating a programmable processor in a focus servo system of an optical disk drive to obtain focus capture, including:

operating the focus servo system in an open-loop mode;

generating focus drive signals causing an objective lens to be driven about a focus axis at a calibration velocity;

peak detecting focus error signals produced while the lens is driven at the calibration velocity, to determined a peak focus error signal value;

storing a calibration threshold value as a function of the peak focus error signal value;

generating focus drive signals causing the objective lens to be driven about the focus axis at a focus capture velocity;

comparing the focus error signal values produced while the lens is driven at the focus capture velocity to the calibration threshold value; and closing the servo loop and operating the focus servo system in a closed-loop mode when the focus error signal values reach the threshold value.

11. The method of claim 10 wherein the steps of generating the focus drive signals causing the objective lens to be driven at a calibration velocity and at a focus capture velocity include generating focus drive signals causing the objective lens to be driven from a position spaced from the optical disk toward the optical disk.

12. The method of claim 10 wherein generating focus drive signals causing the objective lens to be driven at a focus capture velocity includes generating focus drive signals causing the objective lens to be driven at a focus capture velocity which is less than the calibration velocity.

13. The method of claim 12 wherein generating focus drive signals causing the objective lens to be driven at a focus capture velocity includes generating focus drive signals causing the objective lens to be driven at a focus capture velocity which is less than a maximum vertical runout velocity of the optical disk.

14. The method of claim 10 and further including generating focus drive signals causing the objective lens to be accelerated for a short period of time after the focus error signal values each the threshold value and before closing the servo loop.

15. The method of claim 10 and further including:

operating the disk drive at a reference laser power level while generating focus drive signals causing the objective lens to be driven about the focus axis at the calibration velocity;

operating the disk drive at an operating laser power level while generating focus drive signals causing the objective lens to be driven about the focus axis at the focus capture velocity;

generating and storing a working threshold value as a function of the calibration threshold value, the reference laser power level and the operating laser power level;

comparing the focus error signal values produced while the lens is being driven at the focus capture velocity to the working threshold value; and closing the servo loop and operating the focus servo system in the closed-loop mode when the focus error signal values reach the working threshold value.

16. The method of claim 15 wherein the step of generating and storing a working threshold value includes generating the working threshold value as a function of the calibration threshold value and a ratio of the operating laser power level to the calibration laser power level.

17. The method of claim 10 wherein storing the calibration threshold value includes storing a calibrating threshold value equal to approximately 75 percent of the peak focus error signal.

18. The method of claim 10 and further including:

storing a focus status threshold value indicative of focus error signal values which are within limits defining when focus capture is achieved;

comparing focus error signal values to the focus capture status threshold value after closing the servo loop for determining if a focus capture is achieved; and repeating the steps of operating the focus servo system in an open loop mode, generating focus drive signals causing the objective lens to be driven about the focus axis at a focus capture velocity, comparing the focus error signal values to the calibration threshold value, closing the servo loop, and comparing the focus error signal values to the focus capture status threshold value until focus capture is achieved or until the steps are repeated a specified number of times.

19. A method for operating a programmable processor in a focus servo system of an optical disk drive to obtain focus capture, including:
  operating the focus servo system in an open-loop mode at a reference laser power level;
  generating focus drive signals causing an objective lens to be driven about a focus axis at a calibration velocity;
  peak detecting focus error signals produced while the lens is being driven at the calibration velocity, to determine a peak focus error signal value;
  generating and storing a calibration threshold value as a function of the peak focus error signal value;
  generating focus drive signals causing the objective lens to be driven about the focus axis at a focus capture velocity;
  comparing the focus error signal values produced while the objective lens is driven at the focus capture velocity to the calibration threshold value;
  generating focus drive signals causing the objective lens to be accelerated a predetermined period of time when the focus error signal values reach the calibration threshold value;
  closing the servo loop and operating the focus servo system in a closed-loop mode after the lens has been accelerated for the predetermined period of time;
  operating the focus servo system at an operating laser power level;
  opening the servo loop and operating the focus servos system at the operating laser power level;
  generating a working threshold value as a function of the stored calibration threshold value, the reference laser power level and the operating laser power level;
  generating focus drive signals causing the objective lens to be driven about the focus axis at the focus capture velocity;
  comparing the focus error signal values produced while the lens is driven about the focus axis at the focus capture velocity to the working threshold value;
  generating focus drive signals causing the objective lens to be accelerated for a predetermined period of time when the focus error signal values reach the working threshold value; and
  closing the servo loop and operating the servo system in the closed-loop mode after the objective lens has been accelerated for the predetermined period of time.

20. The method of claim 19 wherein the steps of generating focus drive signals causing the objective lens to be driven at the calibration velocity and at a focus capture velocity include generating focus drive signals causing the objective lens to be driven from a position spaced from the optical disk toward the optical disk.

21. The method of claim 19 wherein generating focus drive signals causing the objective lens to be driven at a focus capture velocity includes generating focus drive signals causing the objective lens to be driven at a focus capture velocity which is less than the calibration velocity.

22. The method of claim 21 wherein generating focus drive signals causing the objective lens to be driven at a focus capture velocity includes generating focus drive signals causing the objective lens to be driven at a focus capture velocity which is less than a maximum vertical runout velocity of the optical disk.

23. The method of claim 19 wherein the step of generating and storing a calibration threshold value includes generating and storing a calibration threshold value equal to approximately 75 percent of the peak focus error signal value.

24. The method of claim 19 wherein generating a working threshold value includes generating a working threshold value as a function of the calibration threshold value and a ratio of the operating laser power level to the calibration laser power level.

25. The method of claim 19 and further including:
  storing a focus status threshold value indicative of focus error signal values which are within limits defining when focus capture is achieved;
  comparing focus error signal values to the focus capture status threshold value after closing the servo loop for determining if focus capture is achieved; and
  repeating the steps of opening the servo loop, generating focus drive signals causing the objective lens to be driven about the focus axis at the focus capture velocity, comparing the focus error signal values to the working threshold value, generating focus drive signals causing the objective lens to be accelerated for a predetermined period of times when the focus error signal values reach the working threshold value, closing the servo loop, and comparing focus error signal values to the focus capture status threshold value until focus capture is achieved or until the steps are repeated a specified number of times.

* * * * *